(12) United States Patent
Chen et al.

(10) Patent No.: US 8,564,917 B2
(45) Date of Patent: Oct. 22, 2013

(54) INTEGRATED CIRCUIT HAVING ELECTROSTATIC DISCHARGE PROTECTION

(75) Inventors: Wensong Chen, Fremont, CA (US); Stephen Beebe, Los Altos, CA (US)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 148 days.

(21) Appl. No.: 13/151,898

(22) Filed: Jun. 2, 2011

(65) Prior Publication Data

US 2012/0307405 A1  Dec. 6, 2012

(51) Int. Cl.
*H02H 9/00* (2006.01)

(52) U.S. Cl.
USPC ............................. 361/56; 361/91.1; 361/111

(58) Field of Classification Search
None
See application file for complete search history.

(56) References Cited

U.S. PATENT DOCUMENTS

| | | | |
|---|---|---|---|
| 2007/0195472 A1* | 8/2007 | Kwak et al. | 361/56 |
| 2009/0273870 A1* | 11/2009 | Ishizuka et al. | 361/56 |
| 2010/0309593 A1* | 12/2010 | Morishita | 361/56 |

\* cited by examiner

*Primary Examiner* — Jared Fureman
*Assistant Examiner* — Terrence Willoughby
(74) *Attorney, Agent, or Firm* — Ingrassia Fisher & Lorenz, P.C.

(57) ABSTRACT

Apparatus are provided for integrated circuits that include circuitry to provide protection from electrostatic discharge. An exemplary integrated circuit includes an input/output terminal, a first transistor coupled to the input/output terminal, a second transistor coupled to a control terminal of the first transistor and a reference voltage node, and detection circuitry coupled to a control terminal of the second transistor. The detection circuitry is configured to turn on the second transistor in response to a discharge event to protect the first transistor.

13 Claims, 5 Drawing Sheets

INTEGRATED CIRCUIT HAVING ELECTROSTATIC DISCHARGE PROTECTION

TECHNICAL FIELD

Embodiments of the subject matter generally relate to electronics, and more particularly, relate to circuitry for protecting integrated circuits and other electronic devices from potentially being damaged by electrostatic discharge.

BACKGROUND

Electrostatic discharge (ESD) is a recognized problem facing designers of integrated circuits and other electronic devices. For example, during an ESD event, the discharging electrical current flowing to/from an integrated circuit or another electronic device may result in voltages across one or more electrical components of the device (e.g., transistors, diodes, or the like) that exceed breakdown voltages of those respective electrical components, which, in turn, may damage those electrical components and impair operation of the device or otherwise render the device inoperable. Accordingly, it is desirable to provide integrated circuits electronic devices having protection from excessive voltages across electrical components during ESD events.

BRIEF SUMMARY

An apparatus is provided for an integrated circuit. An exemplary integrated circuit includes an input/output terminal, a first transistor coupled to the input/output terminal, a second transistor coupled to a control terminal of the first transistor and a reference voltage node, and detection circuitry coupled to a control terminal of the second transistor to turn on the second transistor in response to a discharge event.

In another embodiment, an integrated circuit includes an input terminal, a first transistor having a gate terminal coupled to the input terminal and a source terminal coupled to a reference voltage node, a second transistor having a drain terminal coupled to the gate terminal of the first transistor and a source terminal coupled to the reference voltage node, and detection circuitry coupled to a gate terminal of the second transistor to turn on the second transistor in response to a discharge event.

In yet another embodiment, an integrated circuit includes an output terminal, a first transistor having a drain terminal coupled to the output terminal and a source terminal coupled to a first reference voltage node, a second transistor having a source terminal coupled to a second reference voltage node and a drain terminal coupled to a gate terminal of the first transistor, and detection circuitry coupled to a gate terminal of the second transistor to turn on the second transistor to apply a voltage substantially equal to a voltage of the second reference voltage node to the gate terminal of the first transistor in response to a discharge event.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the subject matter described herein generally relate to integrated circuits or other electronic devices having circuitry coupled to an input/output (I/O) terminal that provides protection from electrostatic discharge events. In practice, electrostatic discharge events may occur in a number of different ways. For example, it can happen when the substrate (or die) of the device is charged to one voltage while an I/O terminal is shorted to ground (e.g., a different voltage), which is also referred to as a charged device discharge (or charged device model (CDM) discharge event). Electrostatic discharge can also occur when an object (e.g., a part of the human body) having a charged voltage contacts the I/O terminal, which is also referred to as a human body discharge (or human body model (HBM) discharge event). The discharge protected circuits described herein include a transistor coupled to the control terminal of an I/O transistor coupled to a respective I/O of the integrated circuit device, wherein the transistor is turned on in response to an electrostatic discharge event to prevent voltages applied to terminals of that respective I/O transistor from exceeding its breakdown voltages. It should be noted that although the subject matter is described herein in the context of metal-oxide-semiconductor (MOS) field-effect transistors, the subject matter is not intended to be limited to use with MOSFETs, and may be implemented in an equivalent manner using other transistor devices (such as insulated gate bipolar transistors (IGBTs), bipolar junction transistors (BJTs), or the like) or to protect other semiconductor devices, such as, for example, IGBTs, BJTs, diodes, or the like, from being damaged during electrostatic discharge events.

Figure 1:
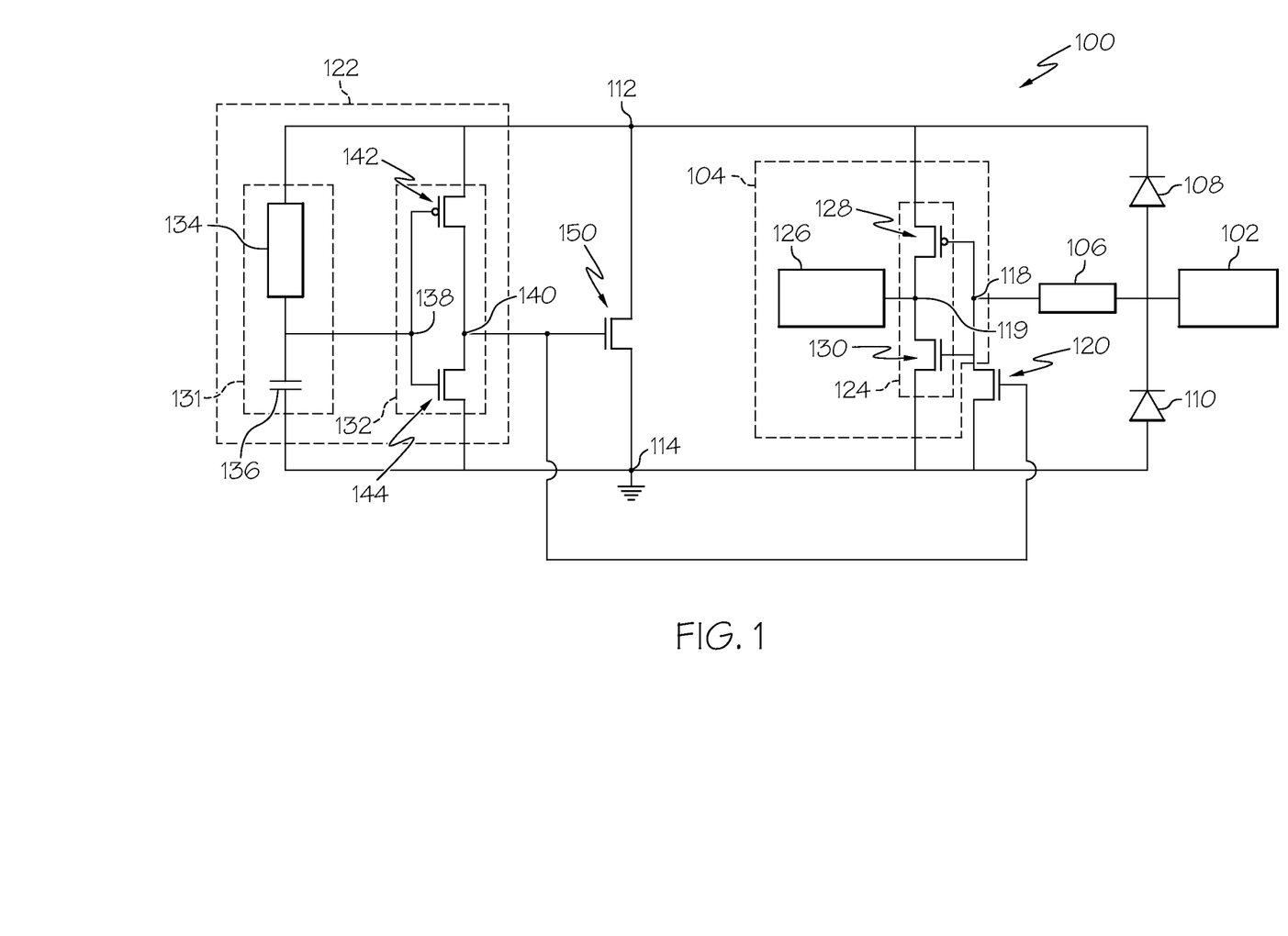
FIG. 1 is a schematic view of an exemplary embodiment of a discharge protected circuit.

Turning now to FIG. 1, in an exemplary embodiment, a discharge protected circuit 100 is implemented in an integrated circuit (or another electronic device) and coupled to an input/output terminal 102 of the integrated circuit. In this regard, in an exemplary embodiment, the circuit elements and/or electrical components of the discharge protected circuit 100 are fabricated or otherwise formed on, mounted to, or provided on the semiconductor substrate (or die) of the integrated circuit, wherein the I/O terminal 102 represents the physical input interface to the integrated circuit that provides electrical connection to/from electrical components external to the integrated circuit from/to the discharge protected circuit 100. Depending on the embodiment, the input terminal 102 may be realized as a pad, pin, lead, contact, or another conductive interface.

The discharge protected circuit 100 of FIG. 1 includes, without limitation, input circuitry 104 coupled to the input terminal 102 via a resistive element 106, and discharge protection circuitry that includes diodes 108, 110, a primary discharge transistor 150, a auxiliary discharge transistor 120, and discharge detection circuitry 122. The diode 108 is coupled between the input terminal 102 and a node 112 configured to receive a positive reference voltage (e.g., for the integrated circuit and/or discharge protected circuit 100), and the diode 110 is coupled between the input terminal 102 and a node 114 configured to receive a negative reference voltage. For convenience, but without limitation, the positive reference voltage node 112 may alternatively be referred to herein as the supply voltage node and the negative reference voltage node 114 may alternatively be referred to herein as the ground voltage node. The auxiliary discharge transistor 120 is coupled between an input node 118 of the input circuitry 104 and the ground voltage node 114, and a control terminal (or gate terminal) of the auxiliary discharge transistor 120 is coupled to the discharge detection circuitry 122. The discharge detection circuitry 122 is configured to detect the discharge event, and in response to detecting the discharge event, turns on or otherwise activates the auxiliary discharge transistor 120 to reduce the voltage differential between the input node 118 and the ground voltage node 114, and thereby protect one or more components of the input circuitry 104 from an electrical breakdown, as described in greater detail below.

In an exemplary embodiment, the input circuitry 104 includes an input inverter arrangement 124 coupled to the input node 118 and input logic circuitry 126 coupled to an output node 119 of the inverter arrangement 124. The inverter arrangement 124 is realized as a complementary MOS inverter that includes a P-type MOS transistor 128 and an N-type MOS transistor 130. As illustrated, the source terminal of the PMOS transistor 128 is connected to the supply voltage node 112, the gate terminal of the PMOS transistor 128 is connected to the gate terminal of the NMOS transistor 130 at the input node 118, the drain terminal of the PMOS transistor 128 is connected to the drain terminal of the NMOS transistor 130 at the output node 119 of the inverter arrangement 124, and the source terminal of the NMOS transistor 130 is connected to the ground voltage node 114. The input logic circuitry 126 generally represents the transistors, resistors, capacitors, inductors and/or other electrical components of the discharge protected circuit 100 that are configured to perform one or more desired logical operations on the electrical signal at the output node 119 of the inverter arrangement 124 to achieve a particular result, which will vary depending on the needs of the particular integrated circuit.

As illustrated, the diode 108 is configured to allow current to flow from the input terminal 102 to the supply voltage node 112, and the diode 110 is configured to allow current to flow from the ground voltage node 114 to the input terminal 102. In other words, the anode of the diode 108 is coupled to the input terminal 102 and the cathode of the diode is coupled to the supply voltage node 112 to allow current flow from the input terminal 102 to the supply voltage node 112 when the voltage of the input terminal 102 is greater than the voltage of the supply voltage node 112, and the anode of the diode 110 is coupled to the ground voltage node 114 and the cathode of the diode 110 is coupled to the input terminal 102 to allow current flow from the ground voltage node 114 to the input terminal 102 when the voltage of the input terminal 102 is less than the voltage of the ground voltage node 114.

In an exemplary embodiment, the resistive element 106 is connected electrically in series between the input terminal 102 and the input node 118 of the input circuitry 104 to reduce the voltage at the input node 118 relative to the voltage at the input terminal 102 during a discharge event when the voltage of the input terminal 102 is greater than the voltage of the ground voltage node 114. The resistance of the resistive element 106 is preferably greater than the sum of the resistance of the diode 108 and any parasitic resistances between the diode 108 and the source terminal of the PMOS transistor 128, such that a greater percentage of the discharge current flows through the diode 108 than the percentage of the discharge current flowing through the resistive element 106 when the voltage of the input terminal 102 is greater than the voltage of the supply voltage node 112, as described in greater detail below.

In the illustrated embodiment, the auxiliary discharge transistor 120 is realized as an NMOS transistor having its drain terminal connected to the gate terminal of the NMOS transistor 130 at the input node 118, its source terminal connected to the ground voltage node 114, and its gate terminal coupled to the discharge detection circuitry 122. The discharge detection circuitry 122 includes an RC circuit arrangement 131 and an inverter arrangement 132. In an exemplary embodiment, the inverter arrangement 132 is realized as a CMOS inverter that includes a PMOS transistor 142 having its source terminal connected to the supply voltage node 112 and an NMOS transistor 144 having its source terminal connected to the ground voltage node 114, wherein the gate terminal of the PMOS transistor 142 is connected to the gate terminal of the NMOS transistor 144 at an input node 138 of the inverter arrangement 132, and the drain terminal of the PMOS transistor 142 is connected to the drain terminal of the NMOS transistor 144 at an output node 140 of the inverter arrangement 132 that is connected to the gate terminal of the NMOS transistor 120. The RC circuit arrangement 131 includes a resistive element 134 connected between the supply voltage node 112 and the inverter input node 138 and a capacitive element 136 connected between the inverter input node 138 and the ground voltage node 114. The resistance of the resistive element 134 and the capacitance of the capacitive element 136 are chosen to provide a time constant that results in the voltage at the inverter input node 138 being substantially equal to the voltage at the ground voltage node 114 within a desired discharge time. As described in greater detail below, the output node 140 of the inverter arrangement 132 is connected to the gate terminal of the NMOS transistor 120, such that the discharge detection circuitry 122 turns on or otherwise activates the auxiliary discharge transistor 120 in response to a discharge event for the discharge time dictated by the time constant of the RC circuit arrangement 131. The discharge time is preferably chosen to ensure that voltages within the discharge protected circuit 100 are below breakdown voltages of the electrical components of the discharge protected circuit 100 during the discharge event, as described in greater detail below.

In an exemplary embodiment, the primary discharge transistor 150 functions as the primary transistor used to discharge current from the input terminal 102. In the illustrated embodiment, the primary discharge transistor 150 is realized as an NMOS transistor having its drain terminal connected to the supply voltage node 112, its source terminal connected to the ground voltage node 114, and its gate terminal connected to the output node 140 of the inverter arrangement 132. In this manner, the discharge detection circuitry 122 turns on or otherwise activates the primary discharge transistor 150 in response to a discharge event for the discharge time set by the RC circuit arrangement 131. In this regard, the primary discharge transistor 150 and the auxiliary discharge transistor 120 are turned on concurrently. The width (or size) of the primary discharge transistor 150 is chosen to provide a lower on-resistance than that of the auxiliary discharge transistor 120, and also, to discharge (or clamp) a voltage differential between the reference voltage nodes 112, 114 within the discharge time set by the RC circuit arrangement 131 to an amount that ensures voltages within the discharge protected circuit 100 are below breakdown voltages of the electrical components of the input circuitry 104.

Still referring to FIG. 1, in practice, it is possible for the substrate (or die) of the integrated circuit having the discharge protected circuit 100 formed thereon to be charged to a particular voltage level, resulting in the voltages of all of the nodes of the discharge protected circuit 100 being substantially equal to the voltage of the substrate. In this regard, an electrostatic discharge event occurs when a different voltage is applied to the input terminal 102. For example, the substrate (or die) may be negatively charged relative to the voltage at the input terminal 102 (e.g., a negatively Charged Device Model discharge event or negative CDM discharge event). As a result, the voltage at the input terminal 102 will be greater than the voltage at the supply voltage node 112, causing discharge current to flow through the diode 108, which, in turn, increases the voltage at the supply voltage node 112 relative to the ground voltage node 114. The voltage across the capacitive element 136 initially remains unchanged (e.g., zero volts), and thus, the voltage at the inverter input node 138 remains substantially equal to the voltage at the ground voltage node 114, such that once the voltage at the supply voltage node 112 increases by more than the threshold voltage of the PMOS transistor 142, the PMOS transistor 142 will turn on or otherwise conduct current, and thereby increase the voltage at the output node 140 of the inverter arrangement 132 to a voltage substantially equal to the voltage at the supply voltage node 112 (i.e., the voltage at the supply voltage node 112 less the source-to-drain voltage drop across the PMOS transistor 142). As a result of the voltage at the output node 140 increasing relative to the voltage at the ground voltage node 114, the discharge transistors 120, 150 are turned on or otherwise activated to conduct discharge current from the supply voltage node 112 to the ground voltage node 114 via the primary discharge transistor 150 and from the input node 118 to the ground voltage node 114 via the auxiliary discharge transistor 120. As described above, the primary discharge transistor 150 is sized relative to the auxiliary discharge transistor 120 such that a greater percentage of the discharge current is conducted by the primary discharge transistor 150. After the discharge time, the voltage across the capacitive element 136 (e.g., the voltage at the inverter input node 138) will have increased such that the voltage differential between the inverter input node 138 and the supply voltage node 112 is less than the threshold voltage of the PMOS transistor 142, thereby turning off or otherwise deactivating the PMOS transistor 142, which, in turn, turns off or otherwise deactivates the discharge transistors 120, 150. As described above, the capacitance of the capacitive element 136 is chosen such that the voltage differential between the input terminal 102 and the ground voltage node 114 is sufficiently discharged through the discharge transistors 120, 150, resistive element 106, and the diode 108 after the discharge time to a voltage differential that results in voltages within the discharge protected circuit 100 being below the breakdown voltages of the transistors 128, 130 when the discharge transistors 120, 150 are turned off.

One advantage of the discharge protected circuit 100 illustrated in FIG. 1 is that the auxiliary discharge transistor 120 reduces the voltage at the input node 118 during a negatively charged device discharge event to reduce the likelihood of the gate-to-source voltage across the NMOS transistor 130 exceeding the gate breakdown voltage of the NMOS transistor 130. For example, absent the auxiliary discharge transistor 120 configured in the manner described above, the voltage at the input node 118 may increase to a voltage substantially equal to the voltage at the input terminal 102, which may exceed the gate breakdown voltage of the NMOS transistor 130. Thus, by virtue of the discharge protection circuitry of FIG. 1, the voltage difference between the input node 118 and the ground voltage node 114 is less likely to exceed the gate breakdown voltage of NMOS transistor 130 during the negative CDM discharge event. It should be noted that when the substrate (or die) is positively charged relative to the voltage at the input terminal 102 (e.g., a positively charged device discharge event), the voltage at the ground voltage node 114 will be greater than the voltage at the input terminal 102, such that the discharge current flows from the ground voltage node 114 to the input terminal 102 through diode 110.

It should be understood that FIG. 1 is a simplified representation of the discharge protected circuit 100 for purposes of explanation and ease of description, and that practical embodiments may include other devices and components to provide additional functions and features, and/or the discharge protected circuit 100 may be part of a much larger system, as will be understood. For example, a practical embodiment of an integrated circuit may include multiple instances of one or more components of the discharge protected circuit 100, such as the input circuitry 104 and/or the auxiliary discharge transistor 120, which are associated with each input terminal of the integrated circuit. Additionally, the subject matter described in the context of FIG. 1 is not intended to be limited to use with input terminals of an integrated circuit, and may be implemented in an equivalent manner with output terminals of an integrated circuit. Furthermore, although FIG. 1 depicts direct electrical connections between circuit elements and/or terminals, alternative embodiments may employ intervening circuit elements and/or components while functioning in a substantially similar manner.

Figure 2:
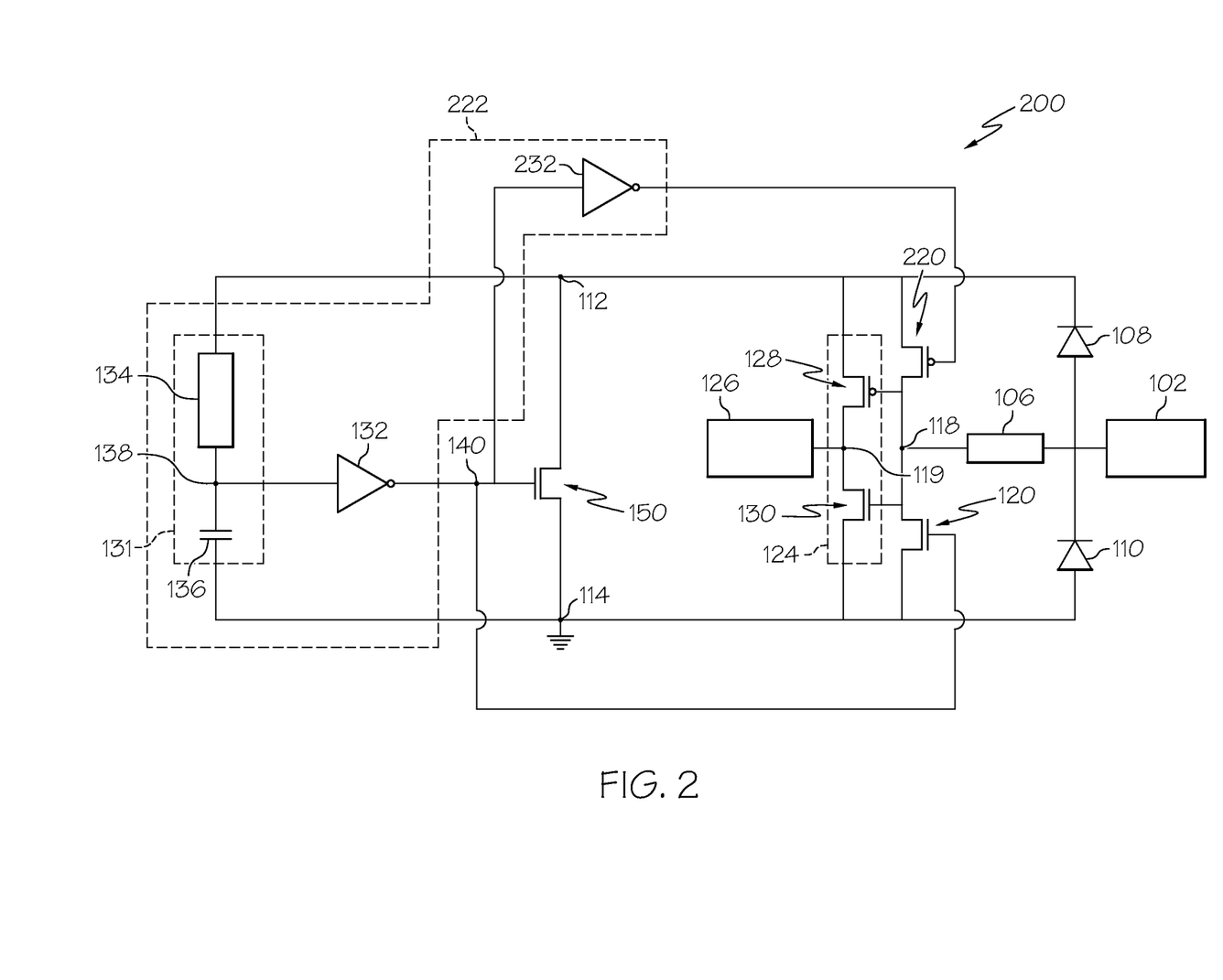
FIG. 2 is a schematic view of another exemplary discharge protected circuit in accordance with one or more embodiments.

FIG. 2 depicts another embodiment of a discharge protected circuit 200. Various elements of the discharge protected circuit 200 are similar to their counterpart elements found in the discharge protected circuit 100 described above with reference to FIG. 1, and accordingly, these common elements and their functionality will not be redundantly described in detail here in the context of the discharge protected circuit 200. In the illustrated embodiment of FIG. 2, the discharge protection circuitry also includes a second auxiliary discharge transistor 220 realized as a PMOS transistor having its source terminal connected to the supply voltage node 112 and its drain terminal connected to the gate terminal of the PMOS transistor 128 at the input node 118. The discharge detection circuitry 222 includes a second inverter arrangement 232 having its input connected to the output node 140 of inverter arrangement 132 and its output connected to the gate terminal of the second auxiliary discharge transistor 220. In an exemplary embodiment, the second inverter arrangement 232 is realized as a CMOS inverter configured in a similar manner as described above with respect to inverter arrangement 132 in the context of FIG. 1.

For the embodiment illustrated in FIG. 2, in practice, it is possible for the input terminal 102 to contact an object that is negatively charged relative to the supply voltage node 112 (e.g., a negative human body model (HBM) discharge event between the input terminal 102 and the supply voltage node 112 when the supply voltage node 112 is grounded). During this negative HBM event, the voltage at the input terminal 102 will be less than the voltage at the ground voltage node 114, causing discharge current to flow through the diode 110, which, in turn, decreases the voltage at the ground voltage node 114 relative to the supply voltage node 112. The voltage across the capacitive element 136 initially remains unchanged, and thus, the voltage at the inverter input node 138 remains substantially equal to the voltage at the ground voltage node 114, such that once the voltage at the ground voltage node 114 decreases by more than the threshold voltage of the PMOS transistor of the inverter arrangement 132 relative to the supply voltage node 112, the PMOS transistor turns on or is otherwise activated, resulting in the voltage at the output node 140 being substantially equal to the voltage at the supply voltage node 112 and turning on or otherwise activating primary discharge transistor 150 and NMOS transistor 120. Additionally, the increased voltage at the input of the second inverter arrangement 232 turns on or otherwise activates the NMOS transistor of the second inverter arrangement 232 to decrease the voltage at the output of the second inverter arrangement 232 to a voltage substantially equal to the voltage of the ground voltage node 114 (neglecting the drain-to-source voltage drop across the NMOS transistor of the second inverter arrangement 232). As a result of the voltage at the gate terminal of the PMOS transistor 220 being decreased, the PMOS transistor 220 is turned on or otherwise activated, which, in turn, maintains the gate terminal of the PMOS transistor 128 at a voltage substantially equal to the voltage at the supply voltage node 112 (neglecting the voltage drop across PMOS transistor 220).

During either a negative HBM discharge event between the input terminal 102 and the supply voltage node 112 or a negative CDM discharge event, the auxiliary discharge transistors 120, 220 are turned on concurrently for the discharge time set by the RC circuit arrangement 131 to provide two different parallel paths for discharge current to/from the input node 118 (e.g., when the voltage at the input node 118 is greater than the voltage at the supply voltage node 112 or less than the voltage at the ground voltage node 114), thereby allowing the total current flowing through the resistive element 106 to increase, which increases the voltage drop across the resistive element 106. One advantage of the discharge protected circuit 200 of FIG. 2 is that the turned-on PMOS transistor 220 can effectively prevent the voltage difference between the input node 118 and the supply voltage node 112 from exceeding the gate breakdown voltage of the PMOS transistor 128 during a negative HBM discharge event.

Still referring to FIG. 2, in an alternative embodiment, the gate terminal of the NMOS transistor 120 may be connected to the ground voltage node 114 instead of the output node 140 while the gate terminal of the PMOS transistor 220 remains connected to the output of the second inverter arrangement 232. In this alternative embodiment, the PMOS transistor 220 increases the current through the resistive element 106 to reduce the voltage at the input node 118 even though the NMOS transistor 120 may be turned off In yet another alternative embodiment, the discharge protected circuit 200 may be implemented without the NMOS transistor 120 altogether and having only the PMOS transistor 220 configured between the input node 118 and the supply voltage node 112.

Figure 3:
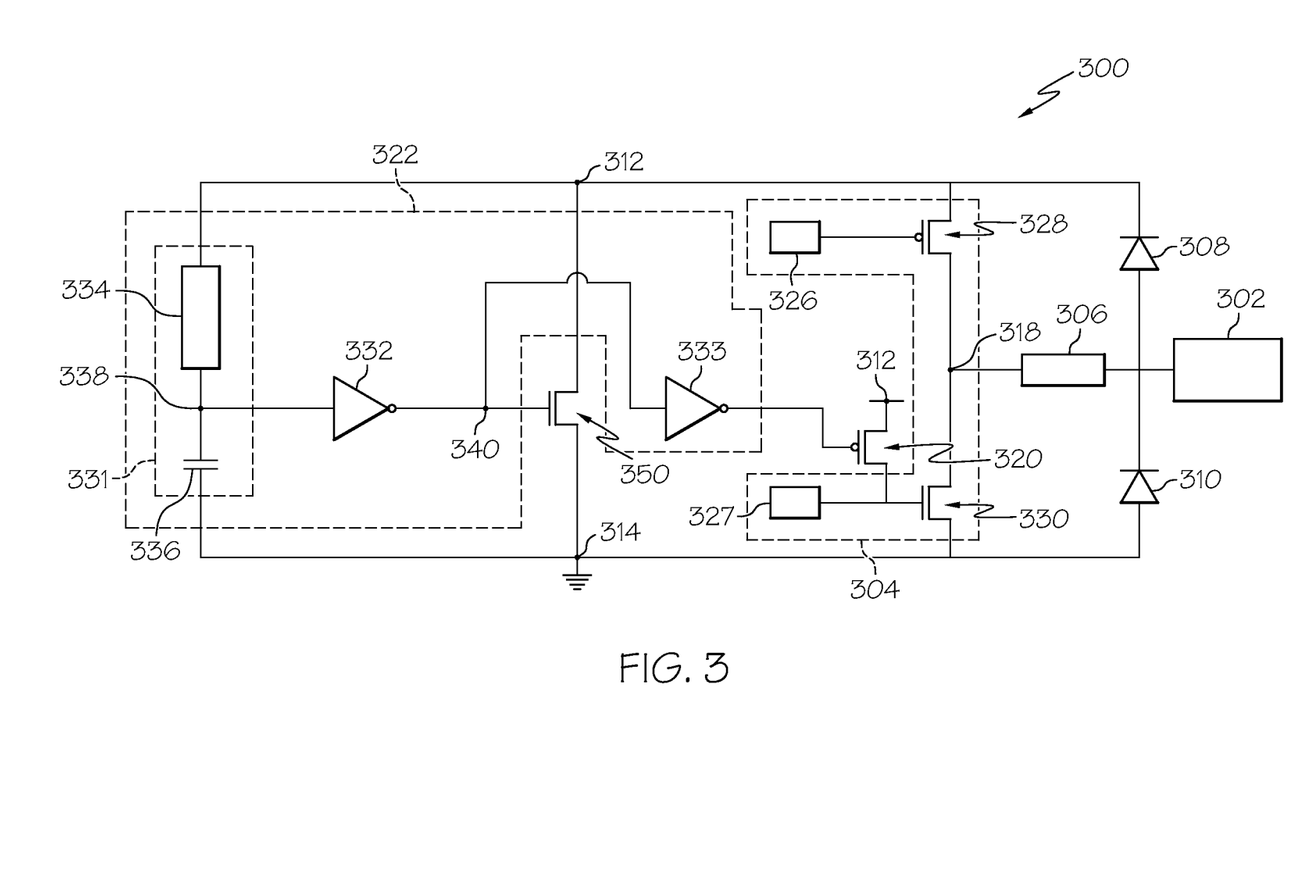
FIG. 3 is a schematic view of another exemplary embodiment of a discharge protected circuit in accordance with one or more embodiments.

FIG. 3 depicts another exemplary embodiment of a discharge protected circuit 300 suitable for use in an integrated circuit (or another electronic device), wherein the discharge protected circuit 300 is fabricated or otherwise formed on the semiconductor substrate (or die) of the integrated circuit and coupled to an input/output terminal 302 of the integrated circuit. In the illustrated embodiment, the I/O terminal 302 represents the physical output interface of the integrated circuit that provides electrical connection to/from electrical components external to the integrated circuit from/to the discharge protected circuit 300, and depending on the embodiment, the output terminal 302 may be realized as a pad, pin, lead, contact, or another conductive interface.

The discharge protected circuit 300 of FIG. 3 includes, without limitation, output circuitry 304 having an output node 318 coupled to the output terminal 302 via a resistive element 306, and discharge protection circuitry that includes diodes 308, 310, a primary discharge transistor 350, discharge detection circuitry 322, and transistor 320. In a similar manner as described above in the context of FIG. 1, the diode 308 is coupled between the output terminal 302 and a node 312 configured to receive a positive reference voltage for the discharge protected circuit 300, and the diode 310 coupled between the output terminal 302 and a node 314 configured to receive a negative reference voltage for the discharge protected circuit 300, wherein the diode 308 is configured to allow current to flow from the output terminal 302 to the positive reference voltage node 312 (or supply voltage node) and the diode 310 is configured to allow current to flow from the negative reference voltage node 314 (or ground voltage node) to the output terminal 302. The transistor 320 is coupled between the output circuitry 304 and the supply voltage node 312, and a control terminal (or gate terminal) of the transistor 320 is coupled to the discharge detection circuitry 322. The discharge detection circuitry 322 is configured to turn on or otherwise activate the transistor 320 in response to a discharge event to reduce the voltage differential between the output node 318 of the output circuitry 304 and the ground voltage node 314, and thereby protect one or more components of the output circuitry 304 from an electrical breakdown, as described in greater detail below.

In the illustrated embodiment, the output circuitry 304 includes a PMOS transistor 328, an NMOS transistor 330, and output logic circuitry 326, 327 coupled to the transistors 328, 330. The output logic circuitry 326, 327 generally represents the transistors, resistors, capacitors, inductors and/or other electrical components of the discharge protected circuit 300 that are configured to perform one or more desired logical operations using electrical signals received from one or more input terminals of the integrated circuit and operate the transistors 328, 330 to achieve a desired output signal at the output node 318, which will vary depending on the needs of the particular integrated circuit. As illustrated, the source terminal of the PMOS transistor 328 is connected to the supply voltage node 312, the drain terminal of the PMOS transistor 328 is connected to the output node 318, and the gate terminal of the PMOS transistor 328 is coupled to the output logic circuitry 326. The drain terminal of the NMOS transistor 330 is connected to the output node 318, the source terminal of the NMOS transistor 330 is connected to the ground voltage node 314, and the gate terminal of the NMOS transistor 330 is coupled to the output logic circuitry 327.

In an exemplary embodiment, the resistive element 306 is connected electrically in series between the output node 318 of the output circuitry 304 and the output terminal 302 to reduce the voltage at the output node 318 relative to the voltage at the output terminal 302 to protect the NMOS transistor 330 during a discharge event when the voltage of the output terminal 302 is greater than the voltage of the ground voltage node 314 (i.e., by reducing the likelihood of the voltage at the output node 318 exceeding the drain-to-source breakdown voltage of the NMOS transistor 330 once the NMOS transistor 330 begins conducting current). It should be noted that in practical embodiments, the resistance of the resistive element 306 is typically limited due to the need to conserve output drivability or other design constraints.

In the illustrated embodiment, the transistor 320 is realized as a PMOS transistor having its drain terminal connected to the gate terminal of the NMOS transistor 330, its source terminal connected to the supply voltage node 312, and its gate terminal coupled to the discharge detection circuitry 322. As described above in the context of FIGS. 1-2, the discharge detection circuitry 322 includes an RC circuit arrangement 331, a first inverter arrangement 332, and a second inverter arrangement 333, wherein the resistance of the resistive element 334 and the capacitance of the capacitive element 336 are chosen to provide a time constant that results in the voltage at the inverter input node 338 being substantially equal to the voltage at the supply voltage node 312 within a desired discharge time. In a similar manner as set forth above in the context of FIGS. 1-2, in an exemplary embodiment, each of the inverter arrangements 332, 333 is realized as a CMOS inverter including a PMOS transistor having its source terminal connected to the supply voltage node 312 and an NMOS transistor having its source terminal connected to the ground voltage node 314, wherein the gate terminals of the PMOS transistor and the NMOS transistor are connected at the input node of the respective inverter arrangement 332, 333, and the drain terminals of the PMOS transistor and the NMOS transistor are connected at the output node of the respective inverter arrangement 332, 333. As set forth above in the context of FIG. 1, in an exemplary embodiment, the primary discharge transistor 350 is realized as an NMOS transistor having its drain terminal connected to the supply voltage node 312, its source terminal connected to the ground voltage node 314, and its gate terminal connected to the output node 340 of the first inverter arrangement 332, wherein the discharge detection circuitry 322 turns on or otherwise activates the primary discharge transistor 350 in response to a discharge event for the discharge time set by the RC circuit arrangement 331.

Still referring to FIG. 3, in practice, it is possible for the output terminal 302 to contact an object that is charged to a positive voltage relative to the voltage of the substrate (or die) of the integrated circuit having the discharge protected circuit 300 formed thereon (e.g., a positive human body model (HBM) discharge event between output and ground). During this positive HBM event (or a negative CDM event), the voltage at the output terminal 302 will be greater than the voltage at the supply voltage node 312, causing discharge current to flow through the diode 308, which, in turn, increases the voltage at the supply voltage node 312 relative to the ground voltage node 314. The voltage across the capacitive element 336 initially remains unchanged, and thus, the voltage at the inverter input node 338 remains substantially equal to the voltage at the ground voltage node 314, such that once the voltage at the supply voltage node 312 increases by more than the threshold voltage of the PMOS transistor of the inverter arrangement 332, the PMOS transistor turns on or is otherwise activated, thereby increasing the voltage at the output node 340 and turning on or otherwise activating primary discharge transistor 350. Additionally, the increased voltage at the input of the second inverter arrangement 333 turns on or otherwise activates the NMOS transistor of the second inverter arrangement 333 to decrease the voltage at the output of the second inverter arrangement 333 to a voltage substantially equal to the voltage of the ground voltage node 314 (neglecting the drain-to-source voltage drop across the NMOS transistor of the second inverter arrangement 333). As a result of the voltage at the gate terminal of the PMOS transistor 320 being decreased, the PMOS transistor 320 is turned on or otherwise activated, which, in turn, increases the voltage at the gate terminal of the NMOS transistor 330 to a voltage substantially equal to the voltage at the supply voltage node 312 (neglecting the voltage drop across PMOS transistor 320), and thereby turns on or otherwise activates the NMOS transistor 330 to provide a path for discharge current from the output node 318 to the ground voltage node 314. In this manner, the voltage at the output node 318 is reduced by turning on the NMOS transistor 330, thereby preventing the voltage difference between the output node 318 and the ground voltage node 314 from exceeding the drain-to-source breakdown voltage of the NMOS transistor 330 during a discharge event where the output terminal 302 has higher potential relative to the substrate (or die). As described above, the primary discharge transistor 350 is sized such that a greater percentage of the discharge current is conducted by the primary discharge transistor 350 than NMOS transistor 330. As described above, after the discharge time, the voltage across the capacitive element 336 (e.g., the voltage at the inverter input node 338) increases, such that the voltage differential between the inverter input node 338 and the supply voltage node 312 is less than the threshold voltage of the PMOS transistor of the first inverter arrangement 332, thereby turning off or otherwise deactivating the transistors 320, 330, 350. As set forth above, the capacitance of the capacitive element 336 is chosen such that any voltage differential between the output terminal 302 and the ground voltage node 314 will be reliably discharged through transistor 350 to a voltage level that is low enough to prevent any voltages within the discharge protected circuit 300 from exceeding the breakdown voltages any of the electrical components of the output circuitry 304 after the discharge time.

One advantage of the discharge protected circuit 300 illustrated in FIG. 3 is that the transistor 320 acts to reduce the voltage at the output node 318 during a negative CDM or positive HBM discharge event between the output terminal 302 and the ground voltage node 314 to prevent the drain-to-source voltage across the NMOS transistor 330 from exceeding the breakdown voltage of the NMOS transistor 330. For example, without the PMOS transistor 320, the voltage at the output node 318 increases to a voltage substantially equal to the voltage at the output terminal 302, which may exceed the drain-to-source breakdown voltage of the NMOS transistor 330. By virtue of the configuration of the PMOS transistor 320 described above, the NMOS transistor 330 is turned on during a negative CDM or positive HBM discharge event to reduce the likelihood of the voltage at the output node 318 exceeding the breakdown voltage of NMOS transistor 330. It will be appreciated that during a positive CDM or negative HBM discharge event between output terminal 302 and ground voltage node 314, current will flow from the ground voltage node 314 to the output terminal 302 via diode 310.

It should be understood that FIG. 3 is a simplified representation of the discharge protected circuit 300 for purposes of explanation and ease of description, and that practical embodiments may include other devices and components to provide additional functions and features, and/or the discharge protected circuit 300 may be part of a much larger system, as will be understood. For example, a practical embodiment of an integrated circuit may include multiple instances of one or more components of the discharge protected circuit 300, such as the output circuitry 304 and/or the transistor 320, which are associated with each output terminal of the integrated circuit. In this regard, a practical embodiment of an integrated circuit may include instances of the output circuitry 304 and/or transistor 320 associated with each of the output terminals of the integrated circuit in combination with instances of elements from either the discharge protected circuit 100 of FIG. 1 or the discharge protected circuit 200 of FIG. 2 (e.g., the input circuitry 104, NMOS transistor 120 and/or PMOS transistor 220) associated with each of the input terminals of the integrated circuit. Additionally, the subject matter described in the context of FIG. 3 is not intended to be limited to use with output terminals of an integrated circuit, and may be implemented in an equivalent manner with input terminals of an integrated circuit. Furthermore, although FIG. 3 depicts direct electrical connections between circuit elements and/or terminals, alternative embodiments may employ intervening circuit elements and/or components while functioning in a substantially similar manner.

Figure 4:
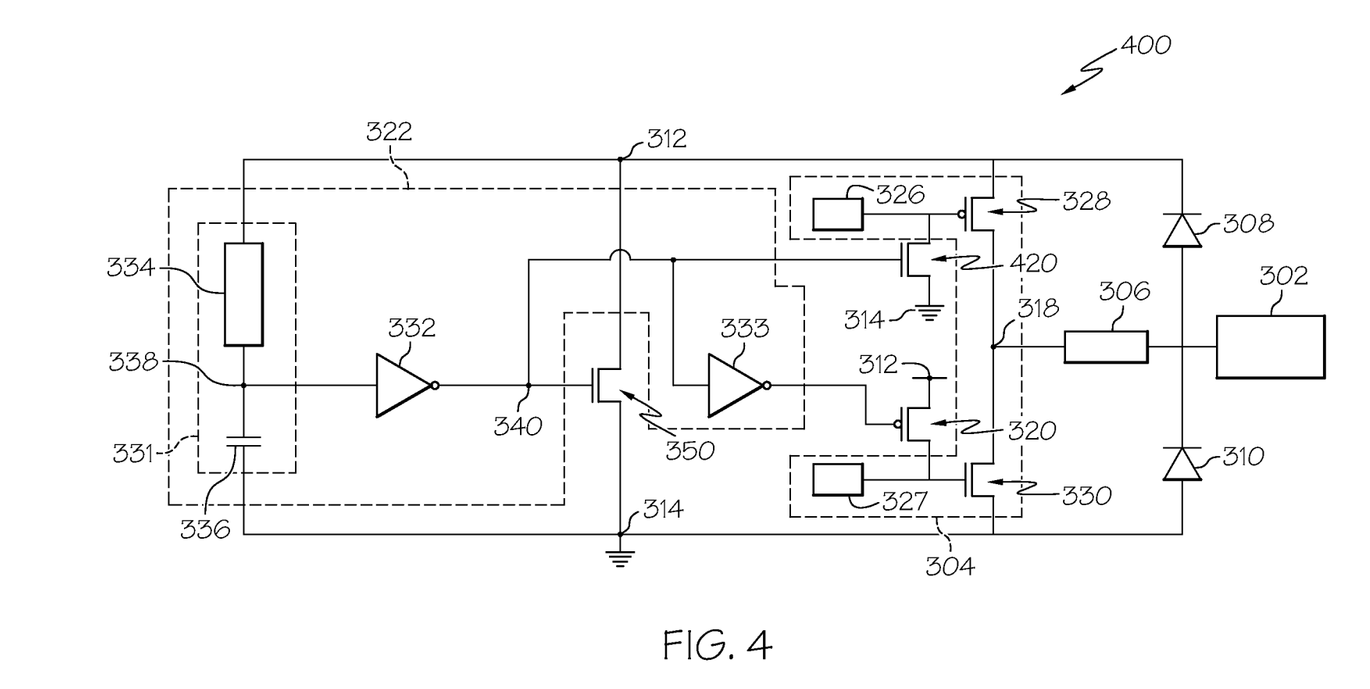
FIG. 4 is a schematic view of another exemplary discharge protected circuit in accordance with one or more embodiments.

FIG. 4 depicts another embodiment of a discharge protected circuit 400. Various elements of the discharge protected circuit 400 are similar to their counterpart elements found in the discharge protected circuit 300 described above with reference to FIG. 3, and accordingly, these common elements and their functionality will not be redundantly described in detail here in the context of the discharge protected circuit 400. In the illustrated embodiment of FIG. 4, the discharge protection circuitry includes a NMOS transistor 420 having its source terminal connected to the node 314, its drain terminal connected to the gate terminal of the PMOS transistor 328, and its gate terminal connected to the output node 340 of the first inverter arrangement 332.

One advantage of the discharge protected circuit 400 of FIG. 4 is that the NMOS transistor 420 provides discharge protection for the PMOS transistor 328 during a negative HBM discharge event between the output terminal 302 and the supply voltage node 312 by turning on the PMOS transistor 328, thereby preventing the voltage difference between the output node 318 and the supply voltage node 312 from exceeding the drain-to-source breakdown voltage of the PMOS transistor 328. During a negative HBM event, the voltage at the output terminal 302 will be less than the voltage at the ground voltage node 314, causing discharge current to flow through the diode 310, which, in turn, decreases the voltage at the ground voltage node 314 relative to the supply voltage node 312. The voltage across the capacitive element 336 initially remains unchanged, and thus, the voltage at the inverter input node 338 remains substantially equal to the voltage at the ground voltage node 314, such that once the voltage at the ground voltage node 314 decreases by more than the threshold voltage of the PMOS transistor of the inverter arrangement 332 relative to the supply voltage node 312, the PMOS transistor of the first inverter arrangement 332 is turned on, causing the voltage at the output node 340 to be substantially equal to the voltage at the supply voltage node 312 (less voltage drop across the PMOS transistor of the first inverter arrangement 332). As a result, the voltage at the gate terminal of the NMOS transistor 420 is greater than the voltage at the source terminal of the NMOS transistor 420 (e.g., the ground voltage node 314), thereby turning on or otherwise activating the NMOS transistor 420. By turning on the NMOS transistor 420, the voltage at the gate terminal of the PMOS transistor 328 is pulled to the voltage at the ground voltage node 314 (less the voltage drop across NMOS transistor 420), and as a result, the PMOS transistor 328 is turned on or otherwise activated to provide a path for discharge current between the output terminal 302 and the supply voltage node 312 via the PMOS transistor 328 and the resistive element 306. In this manner, the voltage difference between the output node 318 and the supply voltage node 312 is reduced by virtue of the discharge current flowing through the resistive element 306 increasing the voltage difference between the output node 318 and output terminal 302, and thus, the likelihood of the voltage difference between the output node 318 and the supply voltage node 312 exceeding the drain-to-source breakdown voltage of the PMOS transistor 328 is reduced. As described above, the primary discharge transistor 350 will be turned on concurrently to the NMOS transistor 420 to provide another path for discharge current from the supply voltage node 312 to the output terminal 302 via the primary discharge transistor 350 and diode 310, and the transistors 320, 330 will also be turned on to provide a path for discharge current between the output node 318 and the ground voltage node 314 via the NMOS transistor 330. By virtue of the RC circuit arrangement 331, the voltage across the capacitive element 336 will increase toward the voltage difference between the supply voltage node 312 and the ground voltage node 314, and thereby turns off or otherwise deactivates the transistors 328, 350, 420 after the discharge time.

Figure 5:
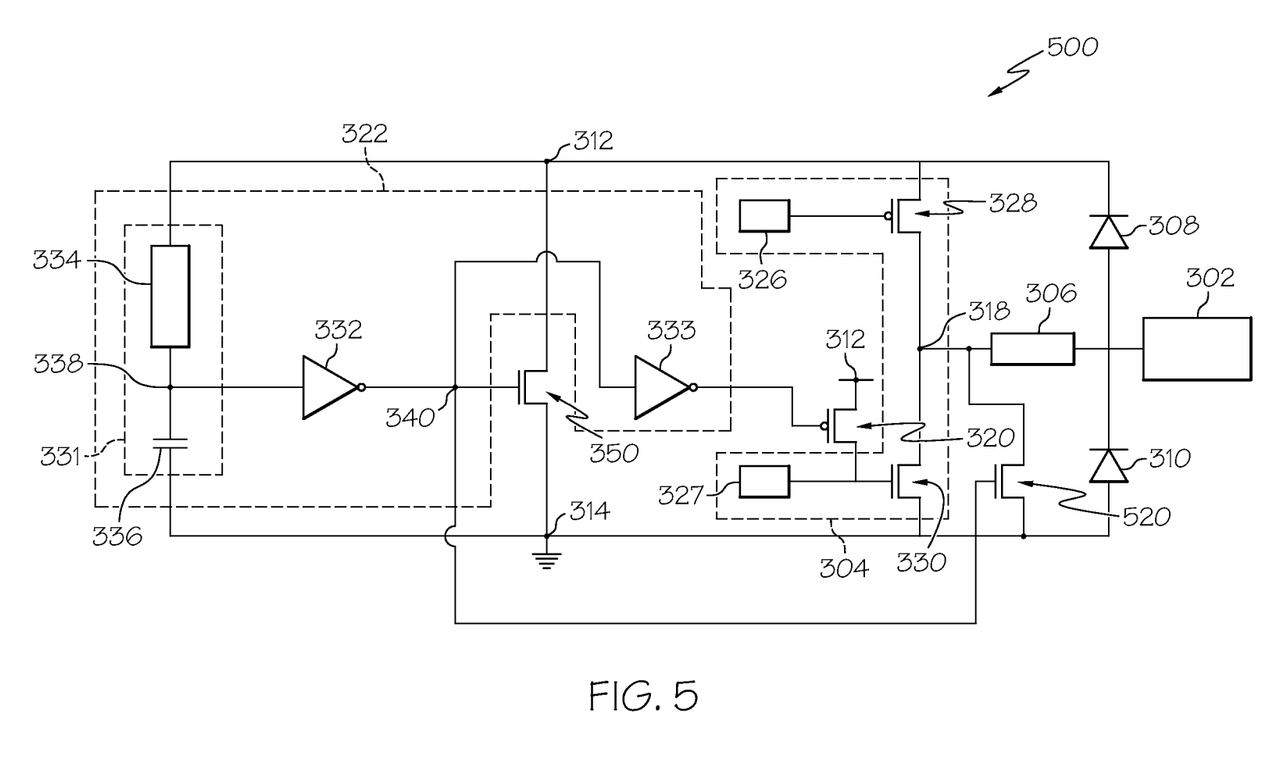
FIG. 5 is a schematic view of another exemplary discharge protected circuit in accordance with one or more embodiments.

FIG. 5 depicts another embodiment of a discharge protected circuit 500. Various elements of the discharge protected circuit 500 are similar to their counterpart elements found in the discharge protected circuit 300 described above with reference to FIG. 3, and accordingly, these common elements and their functionality will not be redundantly described in detail here in the context of the discharge protected circuit 500. In the illustrated embodiment of FIG. 5, the discharge protection circuitry includes a NMOS transistor 520 having its source terminal connected to the node 314, its drain terminal connected to the drain terminal of the NMOS transistor 330 at the output node 318, and its gate terminal connected to the output node 340 of the first inverter arrangement 332.

In a similar manner as described above in the context of FIG. 3, during a negative CDM event or positive HBM event, the voltage at the output terminal 302 will be greater than the voltage at the supply voltage node 312, causing discharge current to flow through the diode 308, which, in turn, increases the voltage at the supply voltage node 312 relative to the ground voltage node 314. The voltage across the capacitive element 336 initially remains unchanged, and thus, the voltage at the inverter input node 338 remains substantially equal to the voltage at the ground voltage node 314, such that once the voltage at the supply voltage node 312 increases by more than the threshold voltage of the PMOS transistor of the inverter arrangement 332, the PMOS transistor turns on or is otherwise activated, thereby increasing the voltage at the output node 340 and turning on or otherwise the NMOS transistor 520 concurrently to activating primary discharge transistor 350. In this manner, the NMOS transistor 520 provides another path for discharge current between the output node 318 and the ground voltage node 314 that is electrically parallel to the current path provided by the NMOS transistor 330. In this regard, the NMOS transistor 520 may be appropriately sized to reduce the amount of current flowing through the NMOS transistor 330, and thereby allow the NMOS transistor 330 to be sized to suit the needs of the intended application. In other words, the sizing and/or design of the NMOS transistor 330 does not need to account for as large of a discharge current, as NMOS transistor 520 may conduct a greater percentage of the discharge current that flows through the resistive element 306.

For the sake of brevity, conventional techniques related to integrated circuit design and/or fabrication, analog and/or digital circuit design, field-effect transistors, CMOS inverters, RC circuits, electrostatic discharge modeling, and other functional aspects of the subject matter may not be described in detail herein. As used herein, a "node" means any internal or external reference point, connection point, junction, signal line, conductive element, or the like, at which a given signal, logic level, voltage, data pattern, current, or quantity is present. Additionally, certain terminology may also be used herein for the purpose of reference only, and thus is not intended to be limiting, and the terms "first", "second" and other such numerical terms referring to structures do not imply a sequence or order unless clearly indicated by the context. The foregoing description also refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An integrated circuit comprising:
   an input/output terminal;
   a semiconductor device coupled to the input/output terminal;
   a first transistor coupled between a first terminal of the semiconductor device and a reference voltage node; and
   detection circuitry coupled to a control terminal of the first transistor to turn on the first transistor in response to a discharge event,
   wherein:
   the semiconductor device comprises a P-type transistor having a drain terminal coupled to the input/output terminal and a source terminal coupled to a second reference voltage node;
   the first transistor comprises an N-type transistor having a source terminal coupled to the reference voltage node and a gate terminal coupled to the detection circuitry; and
   a gate terminal of the P-type transistor is coupled to a drain terminal of the N-type transistor.

2. The integrated circuit of claim 1, wherein:
   the semiconductor device comprises a second transistor having a control terminal coupled to the input/output terminal and a first terminal coupled to the reference voltage node;
   a second terminal of the first transistor is coupled to the control terminal of the second transistor; and
   a third terminal of the first transistor is coupled to the reference voltage node.

3. The integrated circuit of claim 1, wherein the semiconductor device comprises a second transistor having a control terminal, a second terminal coupled to the input/output terminal, and a third terminal coupled to a second reference voltage node.

4. The integrated circuit of claim 3, wherein a fourth terminal of the first transistor is coupled to the control terminal of the second transistor and a fifth terminal of the first transistor is coupled to the reference voltage node.

5. The integrated circuit of claim 1, wherein the detection circuitry is configured to detect the discharge event based on a voltage difference between the reference voltage node and a second reference voltage node, the voltage difference being influenced by a voltage of the input/output terminal.

6. The integrated circuit of claim 1, wherein the semiconductor device comprises a second transistor, the second transistor being turned on in response to turning on the first transistor.

7. An integrated circuit comprising:
   an input/output terminal;
   a semiconductor device coupled to the input/output terminal;
   a first transistor coupled between a first terminal of the semiconductor device and a reference voltage node; and
   detection circuitry coupled to a control terminal of the first transistor to turn on the first transistor in response to a discharge event, wherein:
   the semiconductor device comprises a first P-type transistor having a gate terminal coupled to the input/output terminal and a source terminal coupled to the reference voltage node; and
   the first transistor comprises a second P-type transistor having a gate terminal coupled to the detection circuitry, a drain terminal coupled to the gate terminal of the first P-type transistor, and a source terminal coupled to the reference voltage node.

8. An integrated circuit comprising:
   an input/output terminal;
   a semiconductor device coupled to the input/output terminal;
   a first transistor coupled between a first terminal of the semiconductor device and a reference voltage node; and
   detection circuitry coupled to a control terminal of the first transistor to turn on the first transistor in response to a discharge event, wherein:
   the semiconductor device comprises an N-type transistor having a drain terminal coupled to the input/output terminal and a source terminal coupled to a second reference voltage node;
   the first transistor comprises a P-type transistor having a source terminal coupled to the reference voltage node and a gate terminal coupled to the detection circuitry; and
   a gate terminal of the N-type transistor is coupled to a drain terminal of the P-type transistor.

9. The integrated circuit of claim 8, further comprising:
   a second P-type transistor having a drain terminal coupled to the input/output terminal and a source terminal coupled to the reference voltage node; and
   a second N-type transistor having a source terminal coupled to the second reference voltage node, a gate terminal coupled to the detection circuitry, and a drain terminal coupled to a gate terminal of the second P-type transistor.

10. An integrated circuit comprising:
an input terminal;
a first transistor having a gate terminal coupled to the input terminal and a source terminal coupled to a reference voltage node;
a second transistor having a drain terminal coupled to the gate terminal of the first transistor and a source terminal coupled to the reference voltage node;
a third transistor having a gate terminal coupled to the input terminal and a source terminal coupled to a second reference voltage node;
a fourth transistor having a drain terminal coupled to the gate terminal of the third transistor and a source terminal coupled to the second reference voltage node; and
detection circuitry coupled to a gate terminal of the second transistor to turn on the second transistor in response to a discharge event.

11. The integrated circuit of claim 10, wherein a gate terminal of the fourth transistor is coupled to the detection circuitry, the detection circuitry being configured to turn on the fourth transistor in response to the discharge event.

12. An integrated circuit comprising:
an output terminal;
a first transistor having a drain terminal coupled to the output terminal and a source terminal coupled to a first reference voltage node;
a second transistor having a source terminal coupled to a second reference voltage node and a drain terminal coupled to a gate terminal of the first transistor;
detection circuitry coupled to a gate terminal of the second transistor, the detection circuitry being configured to turn on the second transistor to apply a voltage substantially equal to a voltage of the second reference voltage node to the gate terminal of the first transistor in response to a discharge event and
a third transistor having a drain terminal coupled to the output terminal, a source terminal coupled to the first reference voltage node, and a gate terminal coupled to the detection circuitry, wherein the detection circuitry is configured to turn on the third transistor in response to the discharge event.

13. The integrated circuit of claim 12, further comprising:
a fourth transistor having a source terminal coupled to the first reference voltage node, a drain terminal coupled to a gate terminal of the third transistor, and a gate terminal coupled to the detection circuitry.

* * * * *